United States Patent
Fleischer et al.

(10) Patent No.: US 10,604,853 B2
(45) Date of Patent: Mar. 31, 2020

(54) IPROTON SPONGE AS SUPPLEMENT TO ELECTROLYTES FOR PHOTOCATALYTIC AND ELECTROCHEMICAL CO2 REDUCTION

(71) Applicant: Siemens Aktiengesellschaft, Munich (DE)

(72) Inventors: Maximilian Fleischer, Hoehenkirchen (DE); Philipp Groenninger, Erlangen (DE); Ralf Krause, Herzogenaurach (DE); Mark Matzas, Heroldsbach (DE); Guenter Schmid, Hernhofen (DE); Kerstin Wiesner, Hoehenkirchen-Siegertsbrunn (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 258 days.

(21) Appl. No.: 15/039,808

(22) PCT Filed: Nov. 18, 2014

(86) PCT No.: PCT/EP2014/074899
§ 371 (c)(1),
(2) Date: May 26, 2016

(87) PCT Pub. No.: WO2015/078731
PCT Pub. Date: Jun. 4, 2015

(65) Prior Publication Data
US 2016/0376714 A1 Dec. 29, 2016

(30) Foreign Application Priority Data
Nov. 26, 2013 (DE) ........................ 10 2013 224 077

(51) Int. Cl.
| | | |
|---|---|---|
| *C01B 32/50* | (2017.01) | |
| *C25B 1/00* | (2006.01) | |
| *C25B 11/04* | (2006.01) | |
| *C25B 3/04* | (2006.01) | |
| *B01D 53/32* | (2006.01) | |
| *C10G 2/00* | (2006.01) | |
| *C25B 3/02* | (2006.01) | |

(52) U.S. Cl.
CPC ............ *C25B 11/04* (2013.01); *B01D 53/326* (2013.01); *C10G 2/00* (2013.01); *C10G 2/50* (2013.01); *C25B 3/02* (2013.01); *C25B 3/04* (2013.01); *B01D 2252/103* (2013.01); *B01D 2252/30* (2013.01); *B01D 2255/104* (2013.01); *B01D 2255/106* (2013.01); *B01D 2255/1023* (2013.01); *B01D 2255/209* (2013.01); *B01D 2255/2096* (2013.01); *B01D 2255/20707* (2013.01); *B01D 2255/20761* (2013.01); *B01D 2255/20769* (2013.01); *B01D 2255/20776* (2013.01); *B01D 2255/20792* (2013.01); *B01D 2255/802* (2013.01); *B01D 2257/504* (2013.01); *Y02P 20/152* (2015.11)

(58) Field of Classification Search
CPC .... C25B 3/02; C25B 3/04; C25B 1/00; C01B 31/20; C01B 32/50
USPC ...................... 205/439, 462, 555; 423/437.1
See application file for complete search history.

(56) References Cited

U.S. PATENT DOCUMENTS

| | | | |
|---|---|---|---|
| 3,959,094 A | 5/1976 | Steinberg | 205/450 |
| 5,223,638 A | 6/1993 | McGhee et al. | 560/24 |
| 5,788,666 A | 8/1998 | Atanasoska | 604/20 |
| 7,704,369 B2 | 4/2010 | Olah et al. | 205/450 |
| 8,277,631 B2 | 10/2012 | Eastman et al. | 205/462 |
| 2010/0108488 A1 | 5/2010 | Chen et al. | 204/157.15 |
| 2010/0187123 A1 | 7/2010 | Bocarsly et al. | 205/340 |
| 2010/0261938 A1 | 10/2010 | Olah et al. | 568/840 |
| 2011/0052982 A1 | 3/2011 | Watanabe et al. | 429/207 |
| 2013/0008800 A1* | 1/2013 | Lakkaraju | C25B 3/04 205/413 |
| 2013/0145935 A1 | 6/2013 | Suzuka et al. | 96/234 |
| 2013/0287636 A1* | 10/2013 | Shitara | C25B 1/00 422/162 |
| 2014/0102883 A1* | 4/2014 | Kamai | C25B 11/035 204/242 |

FOREIGN PATENT DOCUMENTS

| | | | |
|---|---|---|---|
| CN | 101743343 A | 6/2010 | C07C 29/00 |
| CN | 101849036 A | 9/2010 | B01D 53/62 |
| CN | 103097290 A | 5/2013 | B01J 20/20 |
| EP | 1685892 A1 | 8/2006 | B01D 67/00 |
| JP | 2011225810 A * | 11/2011 | C08G 71/02 |
| WO | 2010/093092 A1 | 8/2010 | B01D 53/34 |
| WO | WO-2012077198 A1 * | 6/2012 | C25B 1/00 |

OTHER PUBLICATIONS

Hibbert et al., "Acid-Base Properties of Highly Substituted Dianninonaphthalenes," J. Chem. Soc. Perkin Trans. II (1987), pp. 243-246. (Year: 1987).*
Sayama et al., "Photocatalytic Decomposition of Water and Photocatalytic Reduction of Carbon Dioxide over ZnO2 Catalyst," The Journal of Physical Chemistry (Jan. 21, 1993), vol. 97, No. 3, pp. 531-533. (Year: 1993).*
Ma'mun et al., "Experimental and Modeling Study of the Solubility of Carbon Dioxide in Aqueous 30 Mass % 2-(2-Aminoethyl)amino)ethanol Solution," Ind. Eng. Chem. Res. (2006), vol. 45, pp. 2505-2512. (Year: 2006).*
Singh et al., "Structure and Activity Relationships for Amine-Based CO2 Absorbents—II," Chemical Engineering Research and Design (2009), vol. 87, pp. 135-144. (Year: 2009).*

(Continued)

*Primary Examiner* — Edna Wong
(74) *Attorney, Agent, or Firm* — Slayden Grubert Beard PLLC

(57) ABSTRACT

The invention relates to a method for converting carbon dioxide and water, wherein the electrolyte comprises a proton sponge which serves to accumulate CO2 in the electrolyte. The invention further relates to a corresponding use of a proton sponge and to an electrolyte comprising at least one proton sponge.

7 Claims, No Drawings

(56) References Cited

OTHER PUBLICATIONS

Kamata et al., "Scope of Chemical Fixation of Carbon Dioxide Catalyzed by a Bifunctional Monomeric Tungstate," Catalysis Today (2014), vol. 226, pp. 160-166. (Year: 2014).*

Chinese Office Action, Application No. 201480072850.0, 13 pages, dated Nov. 30, 2017.

Staab, Heinz A. et al., "'Proton Sponges' and the Geometry of Hydrogen Bonds: Aromatic Nitrogen Bases with Exceptional Basicities," Angewandte Chemie—International Edition in English, vol. 27, No. 7, pp. 865-879 (15 pages), Jul. 1988.

Kohno, Yoshiumi et al., "Photoreduction of Carbon Dioxide by Hydrogen Over Magnesium Oxide," Phys. Chem. Chem. Phys., vol. 3, pp. 1108-1113 (6 pages), Feb. 22, 2001.

Tseng, I-Hsiang et al., "Photoreduction of $CO_2$ Using Sol-Gel Derived Titania and Titania-Supported Copper Catalysts," Applied Catalysis B: Environmental, vol. 37, pp. 37-48 (12 pages), Nov. 19, 2001.

Hori, Y., "Electrochemical $CO_2$ Reduction on Metal Electrodes," Modern Aspects of Electrochemistry, No. 42, pp. 89-189 (101 pages), 2008.

Abacilar, Nuri Cenap, "News from the chemical super basic proton sponges on the basis of Guanidin, Iminophosphoran and sulfoximpinzettenliganden for proton," Dissertation, University Marburg, German language w/ English abstract, 302 pages, 2009.

Wang, Congjun et al., Visible Light Photoreduction of $CO_2$ Using CdSe/Pt/$TiO_2$ Heterostructured Catalysts, The Journal of Physical Chemistry Letters, pp. 48-53 (6 pages), Nov. 5, 2009.

Wang, Congmin et al., "Carbon Dioxide Capture by Superbase-Derived Protic Ionic Liquids," Angewandte Chemie International Edition, vol. 49, No. 34, pp. 5978-5981 (9 pages), 2010.

Koč, K. et al., "Effect of Silver Doping on the $TiO_2$ for Photocatalytic Reduction of $CO_2$," Applied Catalysis B: Environmental, vol. 96, pp. 239-244 (6 pages), Feb. 26, 2010.

Xi, Guangcheng et al., "General Synthesis of Hybrid $TiO_2$ Mesoporous 'French Fries' Toward Improved Photocatalytic Conversion of $CO_2$ into Hydrocarbon Fuel: A Case of $TiO_2$/ZnO," Chem. Eur. J., vol. 17, pp. 9057-9061 (5 pages), 2011.

Zhang, Ning et al., "Ion-Exchange Synthesis of a Micro/Mesoporous $Zn_2GeO_4$ Photocatalyst at Room Temperature for Photoreduction of $CO_2$," Chem. Commun., vol. 47, pp. 2041-2043 (3 pages), Jan. 5, 2011.

Zhang, Qianyi et al., "Visible Light Responsive Iodine-Doped $TiO_2$ for Photocatalytic Reduction of $CO_2$ to Fuels," Applied Catalysis A: General, vol. 400, pp. 195-202 (8 pages), May 3, 2011.

Rosen, Brian A. et al., "Ionic Liquid Mediated Selective Conversion of $CO_2$ to CO at Low Overpotentials," Science, vol. 334, pp. 643-644 (16 pages), Nov. 4, 2011.

Chen, Xiaoyu et al., "Ultrathin Single-Crystal $WO_3$ Nanosheets by Two-Dimensional Oriented Attachment Toward Enhanced Photocatalystic Reduction of $CO_2$ into Hydrocarbon Fuels under Visible Light," ACS Applied Materials & Interfaces, vol. 4, pp. 3372-3377 (6 pages), Jun. 27, 2012.

Habisreutinger, Severin N. et al., "Photocatalytic Reduction of $CO_2$ on $TiO_2$ and Other Semiconductors," Angew. Chemie. Int. Ed., vol. 52, 38 pages, 2013.

Xie, Shunji et al., "Photocatalytic Reduction of $CO_2$ with $H_2O$: Significant Enhancement of the Activity of Pt-$TiO_2$ in $CH_4$ Formation by Addition of MgO," Chem.Commun., vol. 49, pp. 2451-2453 (3 pages), Nov. 7, 2013.

DiMeglio, John L. et al., "Selective Conversion of $CO_2$ to CO with High Efficiency Using an Inexpensive Bismuth-Based Electrocatalyst," Journal of the American Chemical Society, vol. 135, pp. 8798-8801 (16 pages), Jun. 4, 2013.

Kögel, Julius et al., "A New Synthetic Pathway to the Second and Third Generation of Superbasic Bisphosphazene Proton Sponges: The Run for the Best Chelating Ligand for a Proton," Journal of the American Chemical Society, vol. 135, No. 47, pp. 17768-17774 (7 pages), Oct. 21, 2013.

"Proton Sponge," Wikipedia, URL: http://de.wikipedia.org/wiki/Protonenschwamm, German language w/ English abstract, 6 pages, Nov. 8, 2013.

German Office Action, Application No. 102013224077.5, 8 pages, dated Aug. 7, 2014.

International Search Report and Written Opinion, Application No. PCT/EP2014/074899, 20 pages, dated Jan. 30, 2015.

* cited by examiner

IPROTON SPONGE AS SUPPLEMENT TO ELECTROLYTES FOR PHOTOCATALYTIC AND ELECTROCHEMICAL CO2 REDUCTION

CROSS-REFERENCE TO RELATED APPLICATIONS

This application is a U.S. National Stage Application of International Application No. PCT/EP2014/074899 filed Nov. 18, 2014, which designates the United States of America, and claims priority to DE Application No. 10 2013 224 077.5 filed Nov. 26, 2013, the contents of which are hereby incorporated by reference in their entirety.

TECHNICAL FIELD

The present invention provides a method of reacting carbon dioxide and water wherein the electrolyte comprises a proton sponge used to accumulate $CO_2$ in the electrolyte, a corresponding method of using a proton sponge and also an electrolyte comprising one or more than one proton sponge.

BACKGROUND

The burning of fossil fuels was long considered to be an environmentally friendly source of energy to produce heat and power. Atmospheric disposal of the carbon dioxide ($CO_2$) formed in the combustion with air was a very convenient way to dispose of even large amounts (above 50 000 metric tons per day per lignite-fired power plant in some instances). Concerns about the negative effects of the greenhouse gas $CO_2$ on the climate are driving research into $CO_2$ capture and valorization. Considered thermodynamically, $CO_2$ is at a very low level and therefore very difficult to reduce back into useful products.

In nature, $CO_2$ is reduced to carbohydrates by photosynthesis. This process with its multiplicity of elementary steps at different times and at molecularly different places is very difficult to copy on a large industrial scale. Three possible ways a., b. and c. to reduce $CO_2$ by means of sunlight may be discussed.

a. Photocatalysis is the most complex and difficult way. A catalyst is to convert $CO_2$ in the presence of water directly into methane $CH_4$ or methanol $CH_3OH$.

$$CO_2 + 2H_2O \rightarrow CH_4 + 2O_2$$

$$CO_2 + 2H_2O \rightarrow CH_3OH + 2O_2$$

These processes normally only proceed "willingly" in the opposite direction, as a combustion. A complex logistics of materials on the catalyst particle is therefore an inherent requirement of the direct process of photocatalysis. In addition, the catalyst has to be located within an electrolyte in order that the material and charge balance may equalize. This electrolyte, which is also needed for versions b. and c. is shown by the prior art, however, to still lack satisfactory properties for mass and charge transfer.

b. Considered purely formally, a $CO_2$ reduction catalyst and an $H_2O$ oxidation catalyst can be regarded as electrodes in an electrolytic system featuring a light-driven "voltage source". Hereinbelow this is also defined as an electrically assisted photocatalysis. The $CO_2$ reduction electrode and/or $H_2O$ oxidation electrode are photoelectrically active therein.

c. In a further simplification, the electrical energy for conducting the $CO_2$ reduction and $H_2O$ oxidation comes from an external source of voltage. This source of voltage is more preferably driven using renewable sources of energy such as the wind or the Sun. A conventional electrolysis corresponds to this process.

Photochemical Reduction of $CO_2$:

The prior art in photocatalysis is represented in table 1 and shows that the photochemical conversion of $CO_2$ with water even under good lighting conditions only amounts to conversions in the region of $\mu mol/g/h$. This is perfectly understandable for thermodynamic reasons.

TABLE 1

Conversion of $CO_2$ with water under different conditions and the resulting products as per the prior art

| Literature reference | Main product | Catalyst | Maximum yield | Light source |
| --- | --- | --- | --- | --- |
| ACS Appl. Mater. Interfaces 2012, 4, 3372-3377 | $CH_4$ | $WO_3$ Nano-sheet | ~1.1 μmol/gh | 300 W Xe arc lamp |
| J. Phys. Chem. Lett. 2010, 1, 48-53 | $CH_4$ | CdSe/Pt/$TiO_2$ | ~0.18 μmol/gh | 300 W Xe arc lamp |
| Chem. Commun., 2013, 49, 2451-2453 | $CH_4$ | Pt—MgO/$TiO_2$ | ~0.2 μmol/gh | 100 W Xe arc lamp |
| Applied Catalysis B: Environmental 96 (2010) 239-244 | $CH_4$ | Ag—$TiO_2$ | ~0.1 μmol/gh | 8 W Hg lamp |
| Phys. Chem. Chem. Phys., 2001, 3, 1108-1113 | CO | MgO | ~0.2 μmol/gh | 500 W ultrahigh pressure mercury lamp |
| Chem. Eur. J. 2011, 17, 9057-9061 | $CH_4$ | $TiO_2$/ZnO | ~50 μmol/gh | 300 W Xe arc lamp |
| Applied Catalysis B: Environmental 37 (2002) 37-48 | MeOH | Cu/$TiO_2$ | ~20 μmol/gh | 8 W mercury lamp |

TABLE 1-continued

Conversion of CO₂ with water under different conditions and the resulting products as per the prior art

| Literature reference | Main product | Catalyst | Maximum yield | Light source |
|---|---|---|---|---|
| Applied Catalysis A: General 400 (2011) 195-202 | CO | I—TiO₂ | ~2.4 µmol/gh | 100 W Xe arc lamp |
| Chem. Commun., 2011, 47, 2041-2043 | CH₄ | Pt—ZnGeO₄ | ~28 µmol/gh | full arc Xe lamp |
| Angew. Chem. Int. Ed. 2013, 52, 2-39 | Review article | | | |

If the reaction is carried out in air, then the accumulation of $CO_2$ on the catalyst is a target to enhance the efficiency of the system. In addition to the accumulation of $CO_2$, a certain proportion of water should also be present in the reaction environment in order to supply the corresponding amount of protons. The optimum ratio of $H_2O$ and $CO_2$ can play an important part here. The main products formed vary according to the catalyst and are very frequently reported in the literature as $CH_4$ and CO.

Electrochemical Reduction of $CO_2$:

It was not until the 1970s that there were increasing attempts to systematically study the electrochemical reduction of $CO_2$. Despite many strenuous efforts, no electrochemical system capable of reducing $CO_2$ to competitive energy carriers in a sustainable and energetically favorable manner with sufficiently high current density and acceptable yield has hitherto been successfully developed. Owing to the increasing scarcity of fossil fuel resources and the volatility in the availability of renewable sources of energy, interest has come to be more and more focused on research in $CO_2$ reduction.

The electrolysis of $CO_2$ generally utilizes metal catalysts. Table 2 (derived from: Y. Hori, Electrochemical CO2 reduction on metal electrodes, in: C. Vayenas, et al. (Eds.), Modern Aspects of Electrochemistry, Springer, New York, 2008, pp. 89-189) shows the typical Faraday efficiencies over various metal electrodes. Over Ag, Au, Zn, Pd or Ga for instance $CO_2$ is nearly exclusively converted into CO, whereas over copper a multiplicity of hydrocarbons are observed as reduction products.

TABLE 2

Typical Faraday efficiencies for the conversion of CO₂ over various electrode materials

| Electrode | CH₄ | C₂H₄ | C₂H₅OH | C₃H₇OH | CO | HCOO⁻ | H₂ | Total |
|---|---|---|---|---|---|---|---|---|
| Cu | 33.3 | 25.5 | 5.7 | 3.0 | 1.3 | 9.4 | 20.5 | 103.5 |
| Au | 0.0 | 0.0 | 0.0 | 0.0 | 87.1 | 0.7 | 10.2 | 98.0 |
| Ag | 0.0 | 0.0 | 0.0 | 0.0 | 81.5 | 0.8 | 12.4 | 94.6 |
| Zn | 0.0 | 0.0 | 0.0 | 0.0 | 79.4 | 6.1 | 9.9 | 95.4 |
| Pd | 2.9 | 0.0 | 0.0 | 0.0 | 28.3 | 2.8 | 26.2 | 60.2 |
| Ga | 0.0 | 0.0 | 0.0 | 0.0 | 23.2 | 0.0 | 79.0 | 102.0 |
| Pb | 0.0 | 0.0 | 0.0 | 0.0 | 0.0 | 97.4 | 5.0 | 102.4 |
| Hg | 0.0 | 0.0 | 0.0 | 0.0 | 0.0 | 99.5 | 0.0 | 99.5 |
| In | 0.0 | 0.0 | 0.0 | 0.0 | 2.1 | 94.9 | 3.3 | 100.3 |
| Sn | 0.0 | 0.0 | 0.0 | 0.0 | 7.1 | 88.4 | 4.6 | 100.1 |
| Cd | 1.3 | 0.0 | 0.0 | 0.0 | 13.9 | 78.4 | 9.4 | 103.0 |
| Tl | 0.0 | 0.0 | 0.0 | 0.0 | 0.0 | 95.1 | 6.2 | 101.3 |
| Ni | 1.8 | 0.1 | 0.0 | 0.0 | 0.0 | 1.4 | 88.9 | 92.4 |
| Fe | 0.0 | 0.0 | 0.0 | 0.0 | 0.0 | 0.0 | 94.8 | 94.8 |
| Pt | 0.0 | 0.0 | 0.0 | 0.0 | 0.0 | 0.1 | 95.7 | 95.8 |
| Ti | 0.0 | 0.0 | 0.0 | 0.0 | 0.0 | 0.0 | 99.7 | 99.7 |

The reaction equations which follow illustrate the reactions at the anode and at the cathode for the reduction over a silver cathode by way of example. The reductions over the other metals are similar.

cathode: $2CO_2 + 4e^- + 4H^+ \rightarrow 2CO + 2H_2O$ anode: $2H_2O \rightarrow O_2 + 4H^+ + 4e^-$ One of the primary issues with this electrolysis is that the electrolyte not only has to be very highly conductive, in order to have a low voltage drop, but also has to have a good $CO_2$ solubility, in order to make sufficient $CO_2$ available at the electrode for reduction. This is not possible in the previously discussed aqueous systems owing to the low solubility of $CO_2$ in water (~3 g of $CO_2$ per 1 liter at 1 bar and 20° C.)

Specifically at high current densities, the scissioning reaction of water is dominant in these aqueous systems, since insufficient $CO_2$ molecules are available at the cathode for reduction.

The use of ionic liquids to reduce $CO_2$ has hitherto not been extensively described in the literature. The two publications hereinbelow utilize the known compound [EMIM] $BF_4$ (formula depicted hereinbelow):

Reduction of CO$_2$ to CO over silver electrode: B. A. Rosen, A. Salehi-Khojin, M. R. Thorson, W. Zhu, D. T. Whipple, P. J. A. Kenis, and R. I. Masel, Science 334, 643-644 (2011).

Reduction of CO$_2$ to CO over bismuth electrode: J. L. DiMeglio, and Rosenthal Joel, Journal of the American Chemical Society 135, 8798-8801 (2013).

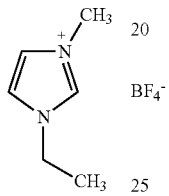

1-ethyl-3-methylimidazolium tetrafluoroborate ([EMIM] BF$_4$)

In addition, U.S. Pat. No. 5,788,666 also discloses the use of immobilized forms of proton traps for pH buffering.

WO 2010/093092 discloses the use of polymers having an amino group to precipitate calcium carbonate, but not in electrochemical applications.

There is a need for an electrolyte and a method of reacting carbon dioxide and water using an electrolyte having an improved efficiency of carbon dioxide conversion.

SUMMARY

The inventors found that the addition of proton sponges used to accumulate CO$_2$ in the electrolyte to an electrolyte/an electrolyte solution results in enhanced efficiency for the reaction of carbon dioxide and water.

The addition of proton sponges in electrolytes/electrolyte solutions surrounding for example a photocatalyst (in the case of a photocatalysis) and/or an electrode (in the case of an electrolysis) evinces the following advantages:

According to Equation 1, the proton sponges have such a high tendency to bind protons that the hygroscopy of the aqueous or nonaqueous electrolyte is enhanced to such an extent that water is even attracted from the air (PS=proton sponge)

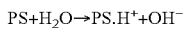
$$PS + H_2O \rightarrow PS.H^+ + OH^-$$ Equation 1:

Highly active OH$^-$ ions are then present in nonaqueous electrolytes in particular, and are "neutralized" by CO$_2$ from the air to form (hydrogen)carbonates (Equation 2). At the same time, therefore, the CO$_2$ accumulates on the catalyst particle.

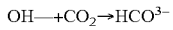
$$OH^- + CO_2 \rightarrow HCO_3^-$$ Equation 2:

In the case of a photocatalysis, therefore, what is being described is an electrolyte (surrounding the catalyst particle) which inherently promotes some CO$_2$ and H$_2$O absorption and hence enhances the reaction rate. The conversions and efficiency are enhanced as a result. The same argumentation holds in the case of an electrolysis for the accumulation of CO$_2$ on the electrodes of an electrolytic cell.

Therefore, in a first embodiment, the invention provides a method of reacting carbon dioxide and water, characterized in that it utilizes a liquid electrolyte or an electrolyte solution comprising one or more than one proton sponge used to accumulate CO$_2$ in the electrolyte.

In a further embodiment, the invention also provides the method of using a proton sponge in an electrolyte or electrolyte solution in the reaction of carbon dioxide and water to accumulate CO$_2$ in the electrolyte.

The invention further also provides an electrolyte or electrolyte solution comprising one or more than one proton sponge.

Further aspects of the present invention will become apparent from the dependent claims and the detailed description.

DETAILED DESCRIPTION

The term "proton sponge" comprehends certain aromatic diamines with unusually high constants of basicity. The aromatic diamines in question are based on aromatics which, in their scaffold structure, include a naphthalene (sub)structure or fluorene (sub)structure where two functional groups derived from amines are present respectively at positions 1 and 8 in the case of naphthalene and at positions 4 and 5 in the case of fluorene, which are shown here.

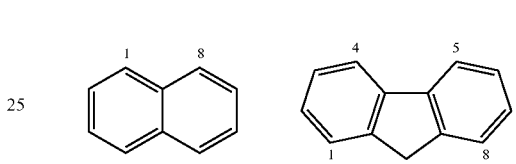

A large diversity of structures derived therefrom are currently known for proton sponges (http://de.wikipedia.org./wiki/Protonenschwamm, as at Nov. 8, 2013; Nuri Cenap Abacilar, "New Development in the Chemistry of Superbasic Proton Sponges Based on Guanidine, Iminophosphorane and Sulfoxime Tweezer Ligands for Protons", German-language thesis, Marburg University, 2009).

Even though naphthalene and fluorene are shown here by way of example, the scaffold structure is not limited to these compounds, but comprehends scaffold structures comprising these structures at least. Substitution on the scaffold structures is not foreclosed either.

The basicity constants are high because the closely adjacent amino groups respond to monoprotonation by reducing the destabilizing overlaps between the nitrogen electron pairs and the strong steric stress. The strong N—H—N hydrogen bond further reduces the steric stress.

The term "liquid electrolyte" herein comprehends not only electrolytes in liquid form but also in molten form, i.e., for example also a salt melt, and the term "electrolyte solution" comprehends electrolytes present in one or more solvents in dissolved form, the solvent preferably comprising water.

In the context of the present invention, the proton sponges are not in an immobilized state in the liquid electrolyte or the electrolyte solution and are preferably also not immobilized by further additives, but they are able to freely move in dissolved or suspended form within the liquid electrolyte or the electrolyte solution and are also commixable therein. One particular benefit of proton sponges in this context relies on their action as "carbonate traps", i.e., they have a high tendency to form (hydrogen) carbonate salts. Buffering properties and nucleophilicity are less foregrounded. In particular embodiments, the invention does not comprehend polymer-bound proton sponges, since no immobilization is desired in use. The electrolyte and/or electrolyte solution shall be capable of equalizing charge gradients, or the viscosity should be low, preferably <1000 cPs, more preferably <100 cPs, most preferably <10 cPs, for charge transfer.

As noted above, the proton sponges of Equation 1 have a high tendency to bind protons that the hygroscopy of the aqueous or nonaqueous electrolyte is enhanced to such an extent that water is even attracted from the air (PS=proton sponge)

$$PS + H_2O \rightarrow PS \cdot H^+ + OH^- \quad \text{Equation 1:}$$

Highly active OH⁻ ions are then present in nonaqueous electrolytes in particular, and are "neutralized" by $CO_2$ from the air to form (hydrogen)carbonates (Equation 2). At the same time, therefore, the $CO_2$ accumulates on the catalyst particle.

$$OH^- + CO_2 \rightarrow HCO^{3-} \quad \text{Equation 2:}$$

Since, in the process, $CO_2$ passes from the air and/or from physical solution into a chemically dissolved state, the proton sponge serves as "carbonate trap".

The invention in one aspect provides a method of reacting carbon dioxide and water that utilizes a liquid electrolyte or an electrolyte solution comprising one or more than one proton sponge used to accumulate $CO_2$ in the electrolyte. In preferred embodiments, the proton sponge in the liquid electrolyte or the electrolyte solution may be present therein in dissolved or suspended form. Preferably, however, the proton sponge is in dissolved form, so that it may also serve to bring the carbon dioxide into solution. This also facilitates the transfer to a reaction surface at which the carbon dioxide reacts, for example the surface of a photocatalyst or of an electrode of an electrolytic cell, and the surface is more readily accessible to the proton sponge.

In preferred embodiments, the present method of reaction comprises those wherein the reaction is a photocatalysis. Nor is this photocatalysis restricted in any way, and it may take any form that in principle allows a photocatalysis of carbon dioxide. A photocatalysis may take place on surfaces which corresponds to a solar collector for example. In preferred embodiments, the photocatalysis takes place by using a ceramic photosemiconductor, preferably $TiO_2$, ZnO, GaN, $SrTiO_3$, $BaTiO_3$, GaAs, $MoS_2$, $WSe_2$, $MoSe_2$ and/or $WO_3$. Photosemiconductors herein are materials that enable a conversion of light into electrical energy within a cell having two electrodes. In photocatalysis, this electrical energy is then used to drive a chemical reaction, for example an electrolysis of water, wherein the photosemiconductor preferably also acts as a catalyst. Suitable photosemiconductors thus preferably evince as well as good absorption of light, good efficiency of conversion into electrical energy (depending for example on the bandgap of the material) and also some catalytic activity in the chemical conversion of an input material such as water.

In further preferred embodiments, an electrolysis is concerned in the reaction method of the present invention. No particular limitation applies to the cathode space and the anode space in this electrolysis. In the electrolysis, the carbon dioxide may be present in the electrolyte in a dissolved and/or gaseous form, in which case the proton sponge by acting as a carbonate trap then contributes to the increasing rate at which carbon dioxide is converted into carbonate/hydrogencarbonate and thus dissolves. However, the possibility that gaseous carbon dioxide continues to remain in the electrolyte is not ruled out.

There are certain embodiments where it is environmentally preferable for the electrolyte to be further present dissolved in water. The electrolyte herein is not particularly limited as long as it permits a (possibly physical) dissolving of the carbon dioxide. The electrolyte may for example comprise KCl, $K_2SO_4$, $KHCO_3$ or mixtures thereof. In principle, any combinations of cations and anions can serve as conducting salts provided they allow the current densities required.

The electrolysis in certain embodiments may be carried out using a $CO_2$ reduction catalyst as cathode and/or an oxidation catalyst as anode. The cathode-side reaction herein depends on the cathode material and is not limited. Useful cathode materials include, for example, copper, gold, silver, zinc, palladium, gallium, bismuth and also mixtures or alloys thereof. A preferred cathode material comprises copper, for example in an amount of 10 to 100 wt %, based on the cathode material, and preferably the cathode consists essentially of copper or a copper alloy, preferably at more than 90 wt %, more preferably at more than 99 wt % of copper. In principle, conductive doped/undoped oxides such as $TiO_2$, ZnO, ITO (indium tin oxide), AZO (aluminum-doped zinc oxide), etc. are also suitable. The anode material is not subject to any special restrictions and includes any anode materials capable of being used in an electrolysis of water, for example anodes based on platinum, ruthenium or graphite.

In certain embodiments, the cathode-side electrolyte and the anode-side electrolyte may be identical. In such embodiments, an electrolytic cell for the electrolysis of the present invention does not require a membrane. However, it is not ruled out that the electrolytic cell in such embodiments has a membrane, yet this is associated with additional cost and inconvenience regarding the membrane and also the applied voltage.

In certain embodiments, the electrolytic cell has a membrane which separates the cathode space and the anode space of the electrolytic cell to prevent any mixing of the electrolytes. The membrane herein is not subject to any special restrictions provided it separates the cathode space and the anode space. In particular, it prevents essentially any crossover of carbon dioxide and/or its dissolved form to the anode. A preferred membrane is an ion exchange membrane, for example a polymer-based ion exchange membrane. A preferred material for an ion exchange membrane is a sulfonated tetrafluoroethylene polymer such as Nafion®, for example Nafion® 115. Ceramic membranes, for example those mentioned in EP 1685892 A1, are useful as well as polymer membranes.

The present invention further provides the method of using a proton sponge in a liquid electrolyte or an electrolyte solution in the reaction of carbon dioxide and water to accumulate $CO_2$ in the electrolyte. In this method of use, the proton sponge in the electrolyte may preferably be present therein in a dissolved or suspended form and more preferably is present in a dissolved form.

The present invention further includes an electrolyte or electrolyte solution comprising one or more than one proton sponge. The proton sponge in the electrolyte may preferably be present therein in a dissolved or suspended form and is more preferably in a dissolved form.

The electrolyte herein is not particularly limited as long as it permits a (possibly physical) dissolving of the carbon dioxide. The electrolyte may for example comprise KCl, $K_2SO_4$, $KHCO_3$ or mixtures thereof. More than one compound may accordingly be present in the electrolyte or electrolyte solution. In principle, any combinations of cations and anions can serve as conducting salts provided they allow the current densities required. In certain embodiments, the electrolyte may comprise organic cations such as guanidium ions and/or organosubstituted phosphonium ions, organosubstituted sulfonium, pyridinium, pyrrolidinium or morpholinium ions and/or the most commonly used imidazolium ions. These may be used in the anode space, but also in the cathode space, since they are capable of catalyzing the reduction of $CO_2$.

Examples of organic cations are thus guanidinium, pyridinium, pyrrolidinium, morpholinium, organosubstituted phosphonium or sulfonium and also imidazolium ions, which are most commonly used.

Examples of suitable guanidinium cations include those of the following general formula (1):

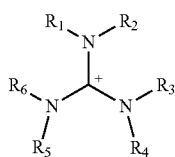

formula (1)

where the substituents $R_1$-$R_6$ may in principle be selected independently of each other from the group of linear, branched or cyclic C1-C25 alkyl, C6-C25 aryl, C7-C25 alkylaryl, C7-C25 arylalkyl, C1-C25 heteroalkyl or C1-C25 heteroaryl, C2-C25 alkylheteroaryl, C2-C25 heteroarylalkyl moieties or hydrogen and may also be asymmetrical. It is further possible for two or more of the substituents to be also bridged with one another via cyclic or heterocyclic compounds. The substituents $R_1$-$R_6$ on the guanidinium cations may be selected for example from the group of linear, branched or cyclic C1-C25 alkyl, C6-C25 aryl, C7-C25 alkylaryl, C7-C25 arylalkyl, C1-C25 heteroalkyl, or C2-C25 heteroaryl, C3-C25 alkylheteroaryl, C3-C25 heteroarylalkyl, C7-C25 heteroalkylaryl, C7-C25 arylheteroalkyl, C3-C25 heteroalkylheteroaryl, C3-C25 heteroarylheteroalkyl moieties, oligoether moieties (e.g., [—$CH_2$—$CH_2$—O-]$_n$) where n may be an integer from 1-12, oligoesters (e.g., [—$CH_2$—CO—O-]$_n$), where n may be an integer from 1-12, or oligoamides (e.g., [—CO—NR-]$_n$) or oligoacrylamides (e.g., [—$CH_2$—$CHCONH_2$-]$_n$), where n may be an integer from 1-12, or hydrogen.

Heteroalkyl and heteroaryl moieties and also the corresponding constituents in alkylheteroaryl and heteroarylalkyl moieties here correspond to moieties/constituents in which one carbon atom of the alkyl chain and of the aryl group, respectively, is replaced by a heteroatom, for example N, S or O.

Exemplary guanidinium cations have for example the following formula (2):

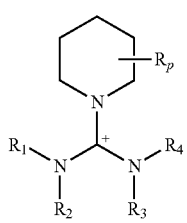

formula (2)

where $R_p$ may be = branched, unbranched or cyclic C1-C20 alkyl, C6-C20 aryl, C7-C20 alkylaryl, C7-C20 arylalkyl, C1-C20 heteroalkyl, or C1-C20 heteroaryl, C2-C20 alkylheteroaryl, C2-C20 heteroarylalkyl moieties and $R_1$-$R_4$ may be independently selected from the group of branched or unbranched C1-C20 alkyl, C6-C20 aryl, C7-C20 alkylaryl, C7-C20 arylalkyl, C1-C20 heteroalkyl, or C2-C20 heteroaryl, C3-C20 alkylheteroaryl, C3-C20 heteroarylalkyl, C7-C20 heteroalkylaryl, C7-C20 arylheteroalkyl, C3-C20 heteroalkylheteroaryl, C3-C20 heteroarylheteroalkyl moieties, oligoether moieties (e.g., [—$CH_2$—$CH_2$—O-]$_n$) where n may be an integer from 1-12, oligoesters (e.g., [—$CH_2$—CO—O-]$_n$), where n may be an integer from 1-12, or oligoamides (e.g., [—CO—NR-]$_n$) or oligoacrylamides (e.g., [—$CH_2$—$CHCONH_2$-]$_n$), where n may be an integer from 1-12, or hydrogen.

Further examples of suitable organic cations are bisguanidinium cations of general formula (3)

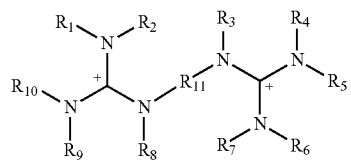

formula (3)

The substituents $R_1$-$R_{11}$ may independently be linear, branched or cyclic C1-C25 alkyl, C6-C25 aryl, C7-C25 alkylaryl, C7-C25 arylalkyl, C1-C20 heteroalkyl or C2-C25 heteroaryl, C3-C25 alkylheteroaryl, C3-C25 heteroarylalkyl, C7-C25 heteroalkylaryl, C7-C25 arylheteroalkyl, C3-C25 heteroalkylheteroaryl, C3-C25 heteroarylheteroalkyl moieties or hydrogen and also form asymmetrical or symmetrical bisguanidinium cations. It is further possible for two or more of the substituents to be also bridged with one another via cyclic or heterocyclic compounds.

Examples of organosubstituted phosphonium ions are compounds of the general formula [$R_f R_g R_h R_j P$]$^+$, where $R_f$, $R_g$, $R_h$ and $R_j$ may be independently selected from the group of linear, branched or cyclic C1-C25 alkyl, C6-C25 aryl, C7-C25 alkylaryl, C7-C25 arylalkyl, C1-C20 heteroalkyl or C2-C25 heteroaryl, C3-C25 alkylheteroaryl, C3-C25 heteroarylalkyl, C7-C25 heteroalkylaryl, C7-C25 arylheteroalkyl, C3-C25 heteroalkylheteroaryl, C3-C25 heteroarylheteroalkyl moieties or hydrogen where at least one of $R_f$, $R_g$, $R_h$ and $R_j$ is not hydrogen. These, like the other cations mentioned also, may likewise also be employed with preference in electrolytes in the cathode space.

Examples of organosubstituted sulfonium ions are compounds of the general formula [$R_f R_g R_h S$]$^+$ where $R_f$, $R_g$ and $R_h$ may be independently selected from the group of linear, branched or cyclic C1-C25 alkyl, C6-C25 aryl, C7-C25 alkylaryl, C7-C25 arylalkyl, C1-C20 heteroalkyl or C2-C25 heteroaryl, C3-C25 alkylheteroaryl, C3-C25 heteroarylalkyl, C7-C25 heteroalkylaryl, C7-C25 arylheteroalkyl, C3-C25 heteroalkylheteroaryl, C3-C25 heteroarylheteroalkyl moieties or hydrogen where at least one of $R_f$, $R_g$ and $R_h$ is not hydrogen. These, like the other cations mentioned also, may likewise also be employed with preference in electrolytes in the cathode space.

Examples of pyridinium ions are compounds of general formula [4],

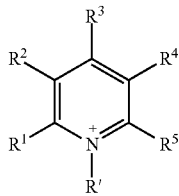

formula [4]

where R' and $R^1$-$R^5$ may be independently selected from the group of linear, branched or cyclic C1-C25 alkyl, C6-C25 aryl, C7-C25 alkylaryl, C7-C25 arylalkyl, C1-C20 heteroalkyl or C2-C25 heteroaryl, C3-C25 alkylheteroaryl, C3-C25 heteroarylalkyl, C7-C25 heteroalkylaryl, C7-C25 arylheteroalkyl, C3-C25 heteroalkylheteroaryl, C3-C25 heteroarylheteroalkyl moieties or hydrogen. These, like the other cations mentioned also, may likewise also be employed with preference in electrolytes in the cathode space.

Examples of morpholinium ions are compounds of general formula [5]

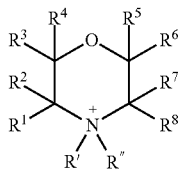

formula [5]

where R', R" and $R^1$-$R^8$ may be independently selected from the group of linear, branched or cyclic C1-C25 alkyl, C6-C25 aryl, C7-C25 alkylaryl, C7-C25 arylalkyl, C1-C20 heteroalkyl or C2-C25 heteroaryl, C3-C25 alkylheteroaryl, C3-C25 heteroarylalkyl, C7-C25 heteroalkylaryl, C7-C25 arylheteroalkyl, C3-C25 heteroalkylheteroaryl, C3-C25 heteroarylheteroalkyl moieties or hydrogen.

These, like the other cations mentioned also, may likewise also be employed with preference in electrolytes in the cathode space.

Examples of pyrrolidinium ions are compounds of general formula [6],

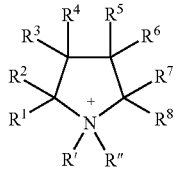

formula [6]

where R', R" and $R^1$-$R^8$ may be independently selected from the group of linear, branched or cyclic C1-C25 alkyl, C6-C25 aryl, C7-C25 alkylaryl, C7-C25 arylalkyl, C1-C20 heteroalkyl or C2-C25 heteroaryl, C3-C25 alkylheteroaryl, C3-C25 heteroarylalkyl, C7-C25 heteroalkylaryl, C7-C25 arylheteroalkyl, C3-C25 heteroalkylheteroaryl, C3-C25 heteroarylheteroalkyl moieties or hydrogen. These, like the other cations mentioned also, may likewise also be employed with preference in electrolytes in the cathode space.

Examples of imidazolium ions are compounds of general formula [7],

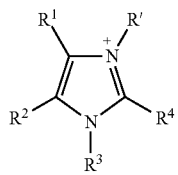

formula [7]

where R' and $R^1$-$R^4$ may be independently selected from the group of linear, branched or cyclic C1-C25 alkyl, C6-C25 aryl, C7-C25 alkylaryl, C7-C25 arylalkyl, C1-C20 heteroalkyl or C2-C25 heteroaryl, C3-C25 alkylheteroaryl, C3-C25 heteroarylalkyl, C7-C25 heteroalkylaryl, C7-C25 arylheteroalkyl, C3-C25 heteroalkylheteroaryl, C3-C25 heteroarylheteroalkyl moieties or hydrogen. These, like the other cations mentioned also, may likewise also be employed with preference in electrolytes in the cathode space.

In certain embodiments, the proton sponge is of general formula (I):

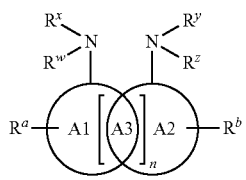

(I)

where n is =0 or 1;

A1 and A2 represent aromatic scaffolds, for example a benzene or naphthalene scaffold, which may be linked through a further ring A3, wherein when n is =1, A3 is present and represents a substituted or unsubstituted cyclopentane ring or five-membered ring which shares the bonding at positions 1 and 2 with the aromatic scaffold A1 and at positions 3 and 4 with the aromatic scaffold A2, and the carbon at position 5 is present in the formula at the bottom between A1 and A2 and may have two substituents $R^d$ and $R^{d'}$;

where $R^d$ and $R^{d'}$ independently represent hydrogen and/or one or more substituted or unsubstituted linear, branched or cyclic alkyl moieties of 1 to 20 carbon atoms and/or substituted or unsubstituted aromatic and/or heteroaromatic moieties of 1 to 40 carbon atoms, wherein when $R^d$ and $R^{d'}$ are present they may combine to form an aliphatic or aromatic ring or polycycles;

when n is =0, the ring A3 is absent and the rings A1 and A2 are fused;

where $R^w$, $R^x$, $R^y$ and $R^z$ independently represent substituted or unsubstituted linear, branched or cyclic alkyl moieties of 1 to 50 carbon atoms and/or substituted or unsubstituted aromatic and/or heteroaromatic moieties of 1 to 100 carbon atoms and/or substituted or unsubstituted linear or branched sulfonylalkyl moieties of 1 to 50 carbon atoms, where 2 or more of $R^x$ to $R^z$ may combine to form a ring or polycycles where not only $R^w$ and $R^x$ but also $R^y$ and $R^z$ may each be replaced by a single moiety $R^w$ or, respectively, $R^y$ to form a double bond on the nitrogen; and where $R^a$ and $R^b$ independently represent hydrogen and/or one or more substituted or unsubstituted linear, branched or cyclic alkyl moieties of 1 to 20 carbon atoms and/or substituted or unsubstituted aromatic and/or heteroaromatic moieties of 1 to 40 carbon atoms on the particular ring of the aromatics skeleton, where when 2 or more of $R^a$ and/or $R^b$ are present, these may combine to form an aliphatic or aromatic ring or polycycles. Preferably, however, $R^a$ and $R^b$ in formula (I) each represent hydrogen.

Preferred moieties $R^w$, $R^x$, $R^y$ and $R^z$ are independently substituted or unsubstituted linear, branched or cyclic alkyl moieties of 3 to 50 carbon atoms and/or substituted or unsubstituted aromatic and/or heteroaromatic moieties of 1 to 100 carbon atoms and/or substituted or unsubstituted linear or branched sulfonylalkyl moieties of 1 to 50 carbon atoms, where 2 or more of $R^x$ to $R^z$ may combine to form a ring or polycycles where not only $R^w$ and $R^x$ but also $R^y$ and $R^z$ may each be replaced by a single moiety $R^w$ or, respectively, $R^y$ to form a double bond on the nitrogen.

Suitable substituents for the moieties $R^w$, $R^x$, $R^y$, $R^z$, $R^a$ and $R^b$ include not only heteroatoms such as N, P, O, S in the alkyl chain but also substituents for the hydrogen atoms of the alkyl chain, for example halogen atoms such as F, Cl, Br, I, preferably F, —$CF_3$ or —CN. It is also possible here for two or more heteroatoms to be linked in the alkyl chain, for example P and N or S and O. Suitable heteroatoms for the heteroaromatics are for example N, P, O, S.

Suitable moieties $R^w$, $R^x$, $R^y$, $R^z$, $R^a$ and $R^b$ may thus be for example independently methyl, ethyl, generally unbranched, branched, fused (decahydronaphthyl), ring-shaped (cyclohexyl) or fully or partially substituted C1-C20 alkyl moieties, as well as ether groups (ethoxy, methoxy, etc.), ester, amide, carbonate groups, —CN, etc., and also be as well as contain ether groups (ethoxy, methoxy, etc.), ester, amide, carbonate groups and contain for example halogens, in particular F, —$CF_3$ or —CN as substituents. Substituted or unsubstituted aliphatic rings and/or ring systems, such as cyclohexyl, are also within the meaning of the invention.

$R^w$, $R^x$, $R^y$, $R^z$, $R^a$ and $R^b$ are not restricted to saturated systems, but also comprise for example substituted/unsubstituted aromatics such as phenyl, biphenyl, naphthyl, phenanthryl, etc., and/or benzyl etc.

An exemplary compilation of suitable heterocycles for the moieties $R^w$, $R^x$, $R^y$, $R^z$, $R^a$ and $R^b$ is depicted in the following view where for simplicity only the skeleton of the aromatics is depicted, which skeletons may in principle be substituted with further substituted linear, branched or cyclic alkyl moieties and/or substituted or unsubstituted aromatic and/or heteroaromatic moieties, in which case the definition of suitable substituents and heteroatoms follows by analogy to the definition for the moieties $R^w$, $R^x$, $R^y$, $R^z$, $R^a$ and $R^b$. In the bypyridine system, $X_1$ to $X_{12}$ may each represent N as well as C. The bonding to the aromatic scaffold A1 and/or A2 and/or to alkyl or substituted alkyl moieties on the aromatic scaffold may be effected at any bonding-capable place on the skeleton.

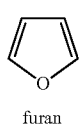 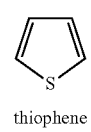 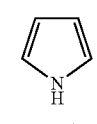 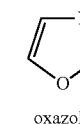

furan · thiophene · pyrrole · oxazole

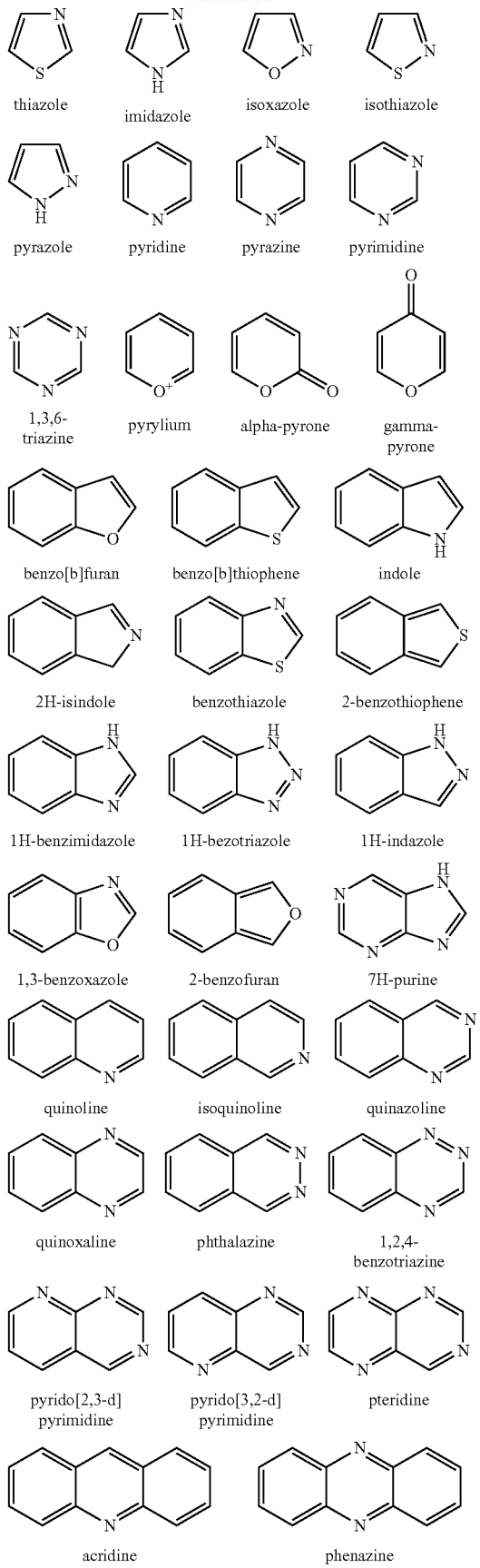

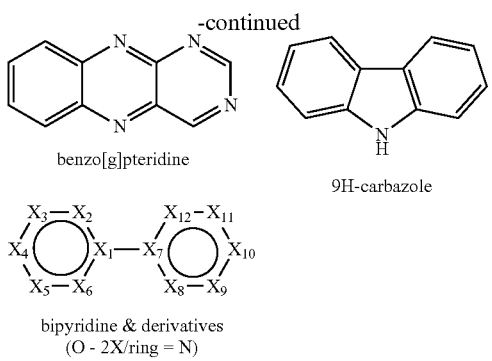

benzo[g]pteridine 9H-carbazole bipyridine & derivatives
(O - 2X/ring = N)

Formula (I) above may be considered to subsume two formulae (Ia) and (Ib), which represent the formula for n=0 and n=1 respectively, and are shown hereinbelow:

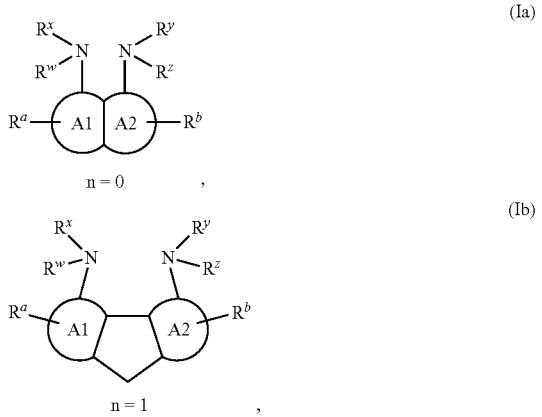

Formula (Ia) herein represents those cases where the two aromatics A1 and A2 are fused, whereas formula (Ib) represents those cases where the two aromatics A1 and A2 are "linked" via a five-membered ring. In the formulae (Ia) and (Ib), $R^w$, $R^x$, $R^y$ and $R^z$ and also $R^a$ and $R^b$ are each as defined above in general formula (I). The compound of formula (Ia) is preferred.

Preference for use as proton sponge of the present invention, for example as compound of formula (I), is given to a compound of the following formulae (II), (III), (IVa); (IVb), (Va) or (Vb):

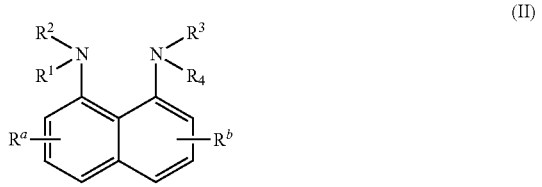

where $R^1$ to $R^4$ independently represent substituted or unsubstituted linear, branched or cyclic alkyl moieties of 1 to 20 carbon atoms and/or substituted or unsubstituted aromatic and/or heteroaromatic moieties of 1 to 40 carbon atoms and/or substituted or unsubstituted linear or branched sulfonylalkyl moieties of 1 to 20 carbon atoms, where 2 or more of $R^1$ to $R^4$ may combine to form an aliphatic or aromatic ring or polycycles; and where $R^a$ and $R^b$ independently represent hydrogen and/or one or more substituted or unsubstituted linear, branched or cyclic alkyl moieties of 1 to 20 carbon atoms and/or substituted or unsubstituted aromatic and/or heteroaromatic moieties of 1 to 40 carbon atoms on the particular ring of the naphthalene skeleton, where when 2 or more of $R^a$ and/or $R^b$ are present, these may combine to form an aliphatic or aromatic ring or polycycles;

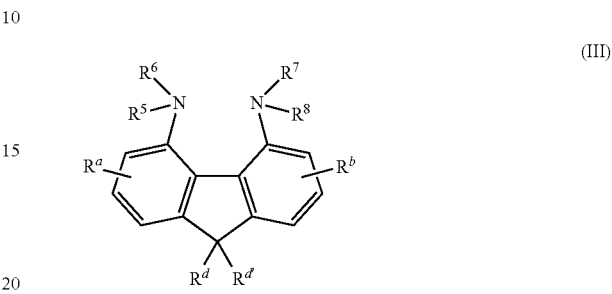

where $R^5$ to $R^8$ independently represent substituted or unsubstituted linear, branched or cyclic alkyl moieties of 1 to 20 carbon atoms and/or substituted or unsubstituted aromatic and/or heteroaromatic moieties of 1 to 40 carbon atoms and/or substituted or unsubstituted linear or branched sulfonylalkyl moieties of 1 to 20 carbon atoms, where 2 or more of $R^5$ to $R^8$ may combine to form an aliphatic or aromatic ring or polycycles; and where $R^a$ and $R^b$ independently represent hydrogen and/or one or more substituted or unsubstituted linear, branched or cyclic alkyl moieties of 1 to 20 carbon atoms and/or substituted or unsubstituted aromatic and/or heteroaromatic moieties of 1 to carbon atoms on the particular ring of the fluorene skeleton, where when 2 or more of $R^a$ and/or $R^b$ are present, these may combine to form an aliphatic or aromatic ring or polycycles; and where $R^d$ and $R^{d'}$ independently represent hydrogen and/or one or more substituted or unsubstituted linear, branched or cyclic alkyl moieties of 1 to 20 carbon atoms and/or substituted or unsubstituted aromatic and/or heteroaromatic moieties of 1 to 40 carbon atoms, wherein when $R^d$ and $R^{d'}$ are present they may combine to form an aliphatic or aromatic ring or polycycles;

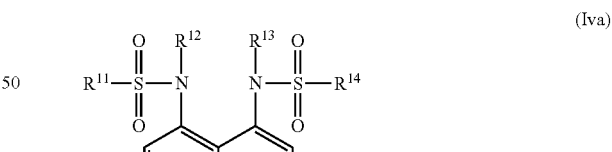

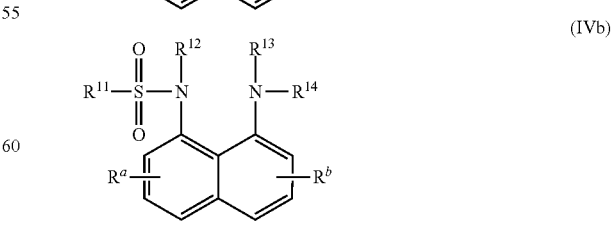

where $R^{11}$ to $R^{14}$ independently represent substituted or unsubstituted linear, branched or cyclic alkyl moieties of 1 to 20 carbon atoms and/or substituted or unsubstituted aromatic and/or heteroaromatic moieties of 1 to 40 carbon atoms and/or substituted or unsubstituted linear or branched sulfonylalkyl moieties of 1 to 20 carbon atoms, where 2 or more of $R^{11}$ to $R^{14}$ may combine to form an aliphatic ring or polycycles; and where $R^a$ and $R^b$ independently represent hydrogen and/or one or more substituted or unsubstituted linear, branched or cyclic alkyl moieties of 1 to 20 carbon atoms and/or substituted or unsubstituted aromatic and/or heteroaromatic moieties of 1 to 40 carbon atoms on the particular ring of the naphthalene skeleton, where when 2 or more of $R^a$ and/or $R^b$ are present, these may combine to form an aliphatic or aromatic ring or polycycles;

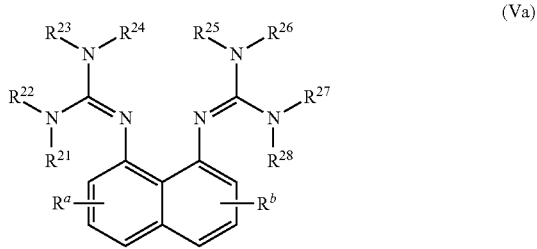

(Va)

where $R^{21}$ to $R^{28}$ independently represent hydrogen and/or substituted or unsubstituted linear, branched or cyclic alkyl moieties of 1 to 20 carbon atoms and/or substituted or unsubstituted aromatic and/or heteroaromatic moieties of 1 to 40 carbon atoms, where 2 or more of $R^{21}$ to $R^{28}$ may combine to form an aliphatic or aromatic ring or polycycles; and where $R^a$ and $R^b$ independently represent hydrogen and/or one or more substituted or unsubstituted linear, branched or cyclic alkyl moieties of 1 to 20 carbon atoms and/or substituted or unsubstituted aromatic and/or heteroaromatic moieties of 1 to carbon atoms on the particular ring of the naphthalene skeleton, where when 2 or more of $R^a$ and/or $R^b$ are present, these may combine to form an aliphatic or aromatic ring or polycycles;

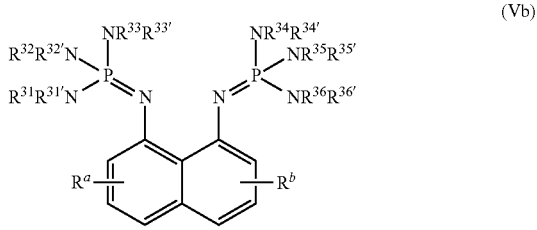

(Vb)

where $R^{31}$ to $R^{36}$ and $R^{31'}$ to $R^{36'}$ independently represent hydrogen and/or substituted or unsubstituted linear, branched or cyclic alkyl moieties of 1 to 20 carbon atoms and/or substituted or unsubstituted aromatic and/or heteroaromatic moieties of 1 to 40 carbon atoms and/or one or more of the pairs $R^{31}$ and $R^{31'}$, $R^{32}$ and $R^{32'}$, $R^{33}$ and $R^{33'}$, $R^{34}$ and $R^{34'}$, $R^{35}$ and $R^{35'}$, $R^{36}$ and $R^{36'}$, preferably $R^{32}$ and $R^{32'}$ and also $R^{35}$ and $R^{35'}$, by forming a double bond instead of the two substituents, represent a phosphazene derivative $P(NR^c_2)_3$, where two or more of $R^{31}$ to $R^{36}$ and $R^{31'}$ to $R^{36'}$ and/or $R^c$ may combine to form an aliphatic or aromatic ring or polycycles;

where the $R^c$s independently represent one or more substituted or unsubstituted linear, branched or cyclic alkyl moieties of 1 to 20 carbon atoms and/or substituted or unsubstituted aromatic and/or heteroaromatic moieties of 1 to 40 carbon atoms; and where $R^a$ and $R^b$ independently represent hydrogen and/or one or more substituted or unsubstituted linear, branched or cyclic alkyl moieties of 1 to 20 carbon atoms and/or substituted or unsubstituted aromatic and/or heteroaromatic moieties of 1 to carbon atoms on the particular ring of the naphthalene skeleton, where when 2 or more of $R^a$ and/or $R^b$ are present, these may combine to form an aliphatic or aromatic ring or polycycles.

Preferred moieties $R^1$ to $R^4$ in formula (II) are independently substituted or unsubstituted linear, branched or cyclic alkyl moieties of 3 to 20 carbon atoms and/or substituted or unsubstituted aromatic and/or heteroaromatic moieties of 1 to 40 carbon atoms and/or substituted or unsubstituted linear or branched sulfonylalkyl moieties of 1 to 20 carbon atoms, where or more of $R^1$ to $R^4$ may combine to form an aliphatic or aromatic ring or polycycles.

Preferably, however, $R^a$ and $R^b$ in formulae (II), (III), (IVa), (IVb), (Va) and (Vb) each represent hydrogen, and/or $R^d$ and $R^{d'}$ in formula (III) each preferably represent hydrogen.

Suitable substituents for the moieties $R^1$ to $R^8$, $R^{11}$ to $R^{14}$, $R^{21}$ to $R^{28}$, $R^{31}$ to $R^{36}$, $R^{31'}$ to $R^{36'}$, $R^a$ and $R^b$ and $R^c$ and $R^d$ in formulae (II), (III), (IVa), (IVb), (Va) and (Vb) include not only heteroatoms such as N, P, O, S in the alkyl chain but also substituents for the hydrogen atoms of the alkyl chain, for example halogen atoms such as F, Cl, Br, I, preferably F, —$CF_3$ or —CN. It is also possible here for two or more heteroatoms to be linked in the alkyl chain, for example P and N or S and O. Suitable heteroatoms for the heteroaromatics are for example N, P, O, S.

Suitable moieties $R^1$ to $R^8$, $R^{11}$ to $R^{14}$, $R^{21}$ to $R^{28}$, $R^{31}$ to $R^{36}$, $R^{31'}$ to $R^{36'}$, $R^a$ and $R^b$ and $R^c$ and $R^d$ in formulae (II), (III), (IVa), (IVb), (Va) and (Vb) may thus be for example independently methyl, ethyl, generally unbranched, branched, fused (decahydronaphthyl), ring-shaped (cyclohexyl) or fully or partially substituted C1-C20 alkyl moieties, as well as ether groups (ethoxy, methoxy, etc.), ester, amide, carbonate groups, —CN, etc., and also be as well as contain ether groups (ethoxy, methoxy, etc.), ester, amide, carbonate groups and contain for example halogens, in particular F, or —CN as substituents. Substituted or unsubstituted aliphatic rings and/or ring systems, such as cyclohexyl, are also within the meaning of the invention. $R^1$ to $R^4$ in formula (II), however, are preferably not methyl and ethyl moieties.

$R^1$ to $R^8$, $R^{11}$ to $R^{14}$, $R^{21}$ to $R^{28}$, $R^{31}$ to $R^{36}$, $R^{31'}$ to $R^{36'}$, $R^a$ and $R^b$ and $R^c$ and $R^d$ in formulae (II), (III), (IVa), (IVb), (Va) and (Vb) are not restricted to saturated systems, but also comprise for example substituted/unsubstituted aromatics such as phenyl, biphenyl, naphthyl, phenanthryl, etc., and/or benzyl etc.

An exemplary compilation of suitable heterocycles for the moieties $R^1$ to $R^8$, $R^{11}$ to $R^{14}$, $R^{21}$ to $R^{28}$, $R^{31}$ to $R^{36}$, $R^{31'}$ to $R^{36'}$, $R^a$ and $R^b$ and $R^c$ and $R^d$ in formulae (II), (III), (IVa), (IVb), (Va) and (Vb) is depicted in the following view regarding $R^w$, $R^x$, $R^y$, $R^z$, $R^a$ and $R^b$ where for simplicity only the skeleton of the aromatics is depicted, which skeletons may in principle be substituted with further substituted linear, branched or cyclic alkyl moieties and/or substituted or unsubstituted aromatic and/or heteroaromatic moieties, in which case the definition of suitable substituents and heteroatoms follows by analogy to the definition for the moieties $R^w$, $R^x$, $R^y$, $R^z$, $R^a$ and $R^b$. In the bypyridine system, $X_1$ to $X_{12}$ may each represent N as well as C. The bonding to the aromatic scaffold A1 and/or A2 and/or to alkyl or substituted alkyl moieties on the aromatic scaffold may be effected at any bonding-capable place on the skeleton.

Preference is further given to proton sponges of formulae (III), (IVa), (IVb), (Va) and (Vb).

Examples of proton sponges for the purposes of the invention are the following compounds:

Substituted and unsubstituted compounds based on 1,8-diamino-naphthalene derivatives:

For example: N,N,N',N'-tetraalkyl- or aryl-1,8-naphthalene-diamines of formula (II)

Particularly high basicities are possessed by the "guanidine-" substituted 1,8-naphthalene derivatives, of formula (Va).

One exemplary compound is the compound having the formula 5*.

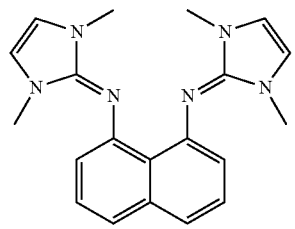
(5*)

The sulfonamide derivatives of formula (IVa) are also within the meaning of the invention.

In particular, all compounds and references are within the meaning of this invention notification that in the doctoral thesis "New Development in the Chemistry of Superbasic Proton Sponges Based on Guanidine, Iminophosphorane and Sulfoxime Tweezer Ligands for Protons" by Nuri Cenap Abacilar from Hanau, Marburg/Lahn 2009, in the chemistry department of the Philipps University (Aug. 19, 2009). Also described therein are in particular phosphazene derivatives such as those of general formula (Vb), of which exemplary compounds of formulae 3, 8# and 7* are depicted hereinbelow.

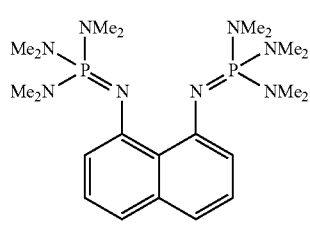
(3)

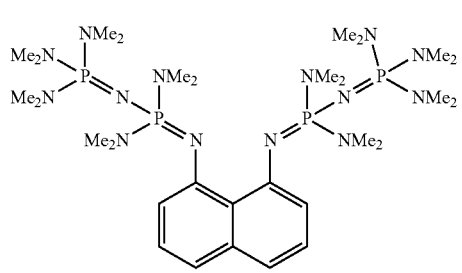
(8#)

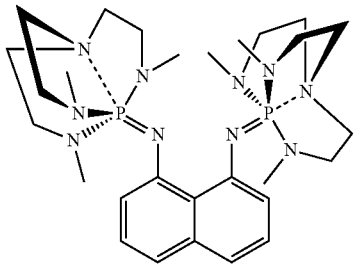
(7*)

The use of the proton sponges in an electrolyte in the manner of the present invention also encompasses the electrolyte itself. The electrolyte, in addition to the proton sponge, may contain further, commonplace additives, for example of the type used in photocatalysis or electrolysis, which are not subject to special restrictions in the context of the invention.

In certain embodiments, the electrolyte solution comprises water and one or more than one conducting salt. The electrolyte herein is otherwise not particularly limited as long as it permits a (possibly physical) dissolving of the carbon dioxide. The electrolyte may for example comprise KCl, $K_2SO_4$, $KHCO_3$ or mixtures thereof as conducting salt. In principle, any combinations of cations and anions can serve as conducting salts provided they allow the current densities required, also including for example those specified above.

The liquid electrolyte or the electrolyte solution of the present invention may further comprise one or more than one ionic liquid.

Exemplary and preferred ionic liquids are based on: imidazolium, pyridinium, pyrrolidinium, piperidinium and guanidinium cations, with corresponding anions. These may be halides, or complex halides such as $BF_4^-$ or $PF_6^-$, carboxylates, sulfates, triflates, bistrifluoromethanesulfonimidates, carbonate or hydrogencarbonate, etc., more preferably carbonate or hydrogencarbonate.

Ionic liquids are organic salts having a melting point below 300° C., preferably below 100° C., more preferably below 50° C.

Possible examples of suitable ionic liquids are listed in table 3 and the list hereinbelow.

TABLE 3

Exemplary ionic liquids 1-benzyl-3-methylimidazolium hexafluorophosphate

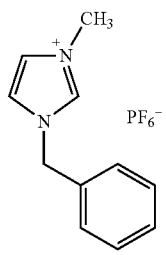

TABLE 3-continued

Exemplary ionic liquids 1-butyl-2,3-dimethylimidazolium hexafluorophosphate 1-butyl-3-methylimidazolium hexafluorophosphate 1-ethyl-3-methylimidazolium hexafluorophosphate 1-hexyl-3-methylimidazolium hexafluorophosphate 1-butyl-3-(3,3,4,4,5,5,6,6,7,7,8,8,8-tridecafluorooctyl) imidazolium hexafluorophosphate 1-methyl-3-(3,3,4,4,5,5,6,6,7,7,8,8,8-tridecafluorooctyl) imidazolium hexafluorophosphate 1-methyl-3-octylimidazolium hexafluorophosphate 1-benzyl-3-methylimidazolium tetrafluoroborate 1-butyl-2,3-dimethylimidazolium tertrafluoroborate 1-butyl-3-methylimidazolium tetrafluoroborate 1-ethyl-3-methylimidazolium tetrafluoroborate 1-hexyl-3-methylimidazolium tetrafluoroborate TABLE 3-continued Exemplary ionic liquids 1-methyl-3-octylimidazolium tetrafluoroborate 1-butyl-3-methylimidazolium trifluoromethanesulfonate 1-ethyl-3-methylimidazolium trifluoromethanesulfonate 1,2,3-trimethylimidazolium trifluoromethane sulfonate 1-ethyl-3-methylimidazolium bis(pentafluoroethylsulfonyl)imide 1-butyl-3-methylimidazolium bis(trifluoromethylsulfonyl)imide 1-butyl-3-methylimidazolium methanesulfonate Tetrabutylammonium bistrifluoromethanesulfonimidate Tetrabutylammonium methanesulfonate Tetrabutylammonium nonafluorobutanesulfonate Tetrabutylammonium heptadecafluorooctanesulfonate Tetrahexylammonium tetrafluoroborate Tetrabutylammonium trifluoromethanesulfonate Tetrabutylammonium benzoate

TABLE 3-continued

Exemplary ionic liquids

Tetrabutylammonium chloride

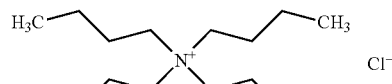

Tetrabutylammonium bromide

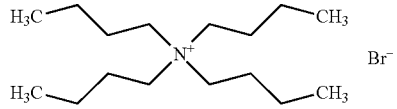

1-benzyl-3-methylimidazolium hexafluorophosphate
1-butyl-2,3-dimethylimidazolium hexafluorophosphate
1-butyl-3-methylimidazolium hexafluorophosphate
1-ethyl-3-methylimidazolium hexafluorophosphate
1-hexyl-3-methylimidazolium hexafluorophosphate
1-butyl-1-(3,3,4,4,5,5,6,6,7,7,8,8,8-tridecafluorooctyl)-imidazolium hexafluorophosphate
1-methyl-3-(3,3,4,4,5,5,6,6,7,7,8,8,8-tridecafluorooctyl)-imidazolium hexafluorophosphate
1-methyl-3-octylimidazolium hexafluorophosphate
1-butyl-2,3-dimethylimidazolium tetrafluoroborate
1-butyl-3-methylimidazolium tetrafluoroborate
1-hexyl-3-methylimidazolium tetrafluoroborate
1-methyl-3-octylimidazolium tetrafluoroborate
1-butyl-3-methylimidazolium trifluoromethanesulfonate
1-ethyl-3-methylimidazolium trifluoromethanesulfonate
1,2,3-trimethylimidazolium trifluromethanesulfonate
1-ethyl-3-methylimidazolium bis(pentafluoroethylsulfonyl)imide
1-butyl-3-methylimidazolium bis(trifluoromethylsulfonyl)imide
1-butyl-3-methylimidazolium methanesulfonate
tetrabutylammonium bistrifluoromethanesulfonimidate
tetrabutylammonium methanesulfonate
tetrabutylammonium nonafluorobutanesulfonate
tetrabutylammonium heptadecafluorooctanesulfonate
tetrahexylammonium tetrafluoroborate
tetrahexylammonium trifluoromethanesulfonate
tetrabutylammonium benzoate
tetrabutylammonium chloride
tetrabutylammonium bromide
1-benzyl-3-methylimidazolium tetrafluoroborate
trihexyltetradecylphosphonium hexafluorophosphate
tetrabutylphosphonium methanesulfonate
tetrabutylphosphonium tetrafluoroborate
tetrabutylphosphonium bromide
1-butyl-3-methylpyridinium bis(trifluoromethylsulfonyl)imide
1-butyl-4-methylpyridinium hexafluorophosphate
1-butyl-4-methylpyridinium tetrafluoroborate
tetrabutylammonium tetraphenylborate
sodium tetraphenylborate
sodium tetrakis(1-imidazolyl)borate
cesium tetraphenylborate The electrolyte may further also comprise supercritical $CO_2$ itself. However, it is then necessary to supply water at the rate of consumption.

In certain embodiments, the liquid electrolyte of the present invention or the electrolyte solution of the present invention comprises one or more than one polar or apolar organic solvent, in particular an alcohol having more than 5 carbon atoms, a high-boiling ether having a boiling point of more than 80° C., preferably 150° C., a high-boiling amine having a boiling point of more than 80° C., preferably 150° C., or a polyamide liquid under electrolysis conditions.

In particular, the liquid electrolyte or the electrolyte solution may consist mainly or partly of water. In particular, high-boiling additives are of advantage (high-boiling alcohols from six carbon atoms, ethers (polyethylene glycol), or amines and liquid polyamides) in order that the electrolyte may not evaporate even in prolonged operation. The defined admixture of water may alter the product spectrum in an electrochemical reduction in particular. This is because a mixture of various hydrocarbon-type compounds such as $CH_4$, $C_2H_4$, CO, etc. are formed at a copper cathode according to the potential and the available $CO_2$ concentration (controllable via the pressure and the temperature in the case of aqueous systems). The mixture can then be shifted to favor a desired hydrocarbon such as, for example, $CH_4$ by precisely adjusting the proton sponge-to-water ratio. When, by contrast, a reduction of $CO_2$ to CO is intended, the omission of water may be used to ensure that no undesired additional evolution of hydrogen shall be observed, but all electrons are employed for the reduction of $CO_2$ (Faraday efficiency of approximately 100% of CO).

comprise polar or apolar organic solvents, such as high-boiling alcohols from six carbon atoms, ethers (polyethylene glycol), or amines (pyridine, quinoline, etc.) and polyamides.

ionic liquids have by their very nature but a very low and/or virtually no vapor pressure at all and therefore are also very highly suitable for use as solvents for the organic proton sponges.

In principle, the compositions thus constructed are employable in methods of reacting $CO_2$ and water, for example photocatalysis or electrolysis, of $CO_2$ or carbonate-containing electrolyte at a comparatively low temperature, in particular room temperature, i.e. 15-30° C., preferably about 20 to 25° C.

Particular preference is given to the employment in a panel for photocatalytic reduction of $CO_2$ in the presence of water. The panel is for example provided means for separating off the products such as methanol or methane. The electrolyte encloses for example the catalytically active particle and thus ensures that matter and electron cycles are closed-loop.

The photocatalytic reduction of $CO_2$ to methanol, methane or other energy carriers or foundation chemicals is so far only delivering very poor yields in the region of μmol/h per gram of catalyst used. One optimization variable is the enhancement in the concentration of protons and $CO_2$ on the catalyst particle in order to increase the probability that the reaction may take place. This is achievable according to the present invention.

In an electrochemical reduction, the use of the proton sponges discussed herein makes it possible to improve efficiencies, for example by reducing the overvoltage at the cathode in the electrolysis. The efficiency for any commercial deployment is at present still not good enough with the systems hitherto discussed in the literature. As well as an improved efficiency, it is possible to improve the selectivity (reduction to one desired hydrocarbon, suppressed formation of other reduction products), specifically in the electrolysis at high current densities in particular. This is achievable by specifically providing to the cathode sufficient $CO_2$ and $H_2O$ to form one particular hydrocarbon.

What is claimed is:
What is claimed is:
1. A method comprising:
reacting carbon dioxide and water in the presence of an electrolyte to form CO2, and
accumulating at least some of the formed CO2 in the electrolyte, the electrolyte comprising a liquid electrolyte or an electrolyte solution including a proton sponge, wherein the proton sponge comprises an aromatic diamine having the general formula:

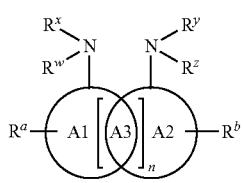
(I)

where:
n is =0 or 1; A1 and A2 represent aromatic scaffolds linkable via a further ring A3, and
when n is =1, A3 is present and represents a substituted or unsubstituted cyclopentane ring which shares the bonding at positions 1 and 2 with the aromatic scaffold A1 and at positions 3 and 4 with the aromatic scaffold A2, and the carbon at position 5 is present between A1 and A2 at the bottom of the formula with two possible substituents Rd and Rd';
Rd and Rd' independently represent hydrogen and/or one or more substituted or unsubstituted linear, branched or cyclic alkyl moieties of 1 to 20 carbon atoms and/or substituted or unsubstituted aromatic and/or heteroaromatic moieties of 1 to 40 carbon atoms, wherein when Rd and Rd' are present they are combinable to form an aliphatic or aromatic ring or polycycles; when n is =0, the ring A3 is absent and the rings A1 and A2 are fused; Rw, Rx, Ry, and Rz independently represent substituted or unsubstituted linear, branched or cyclic alkyl moieties of 1 to 50 carbon atoms and/or substituted or unsubstituted aromatic and/or heteroaromatic moieties of 1 to 100 carbon atoms and/or substituted or unsubstituted linear or branched sulfonylalkyl moieties of 1 to 50 carbon atoms, where 2 or more of Rx to Rz are combinable to form a ring or polycycles where not only Rw and Rx but also Ry and Rz are each replaceable by a single moiety Rw or Ry to form a double bond on the nitrogen; and Ra and Rb independently represent hydrogen and/or one or more substituted or unsubstituted linear, branched or cyclic alkyl moieties of 1 to 20 carbon atoms and/or substituted or unsubstituted aromatic and/or heteroaromatic moieties of 1 to 40 carbon atoms on a particular ring of a respective naphthalene skeleton, where when 2 or more of Ra and/or Rb are present, they are combinable to form an aliphatic or aromatic ring or polycycles.

2. The method of claim 1, wherein the proton sponge in the liquid electrolyte or the electrolyte solution is present in dissolved or suspended form.

3. The method of claim 1, wherein said reacting comprises photocatalysis.

4. The method of claim 3, wherein the photocatalysis utilizes at least one ceramic photosemiconductor selected from the groups consisting of $TiO_2$, $ZnO$, $GaN$, $SrTiO_3$, $BaTiO_3$, $GaAs$, $MoS_2$, $WSe_2$, $MoSe_2$, and $WO_3$.

5. The method of claim 1, wherein said reacting comprises electrolysis.

6. The method of claim 5, wherein the electrolysis is performed with at least one of: (a) a $CO_2$ reduction catalyst as cathode or (b) an oxidation catalyst as anode.

7. The method of claim 6, wherein the cathode contains at least one element selected from the group consisting of: Cu, Au, Ag, Zn, Pd, Bi, and Ga.

* * * * *